No. 892,286. PATENTED JUNE 30, 1908.
W. C. MOORS.
WAGON BRAKE.
APPLICATION FILED SEPT. 26, 1907.
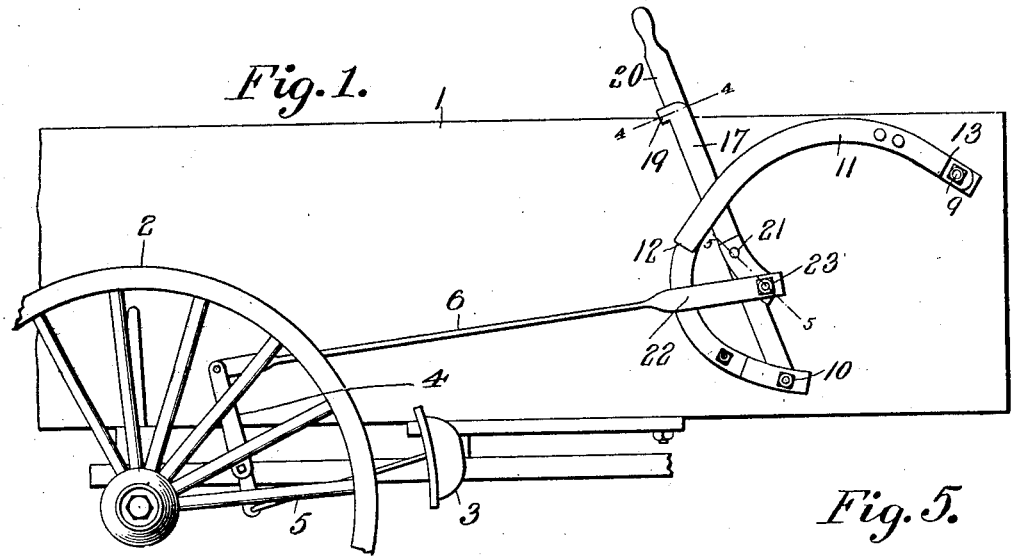
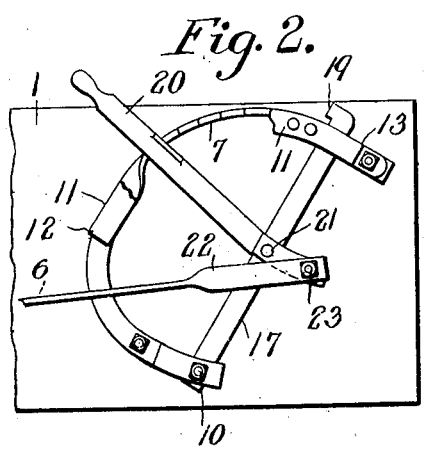
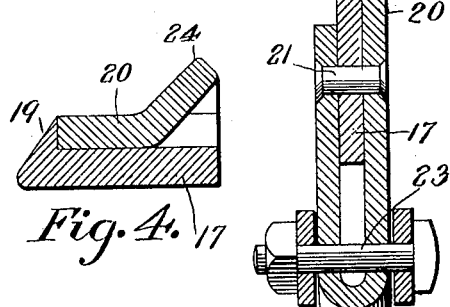
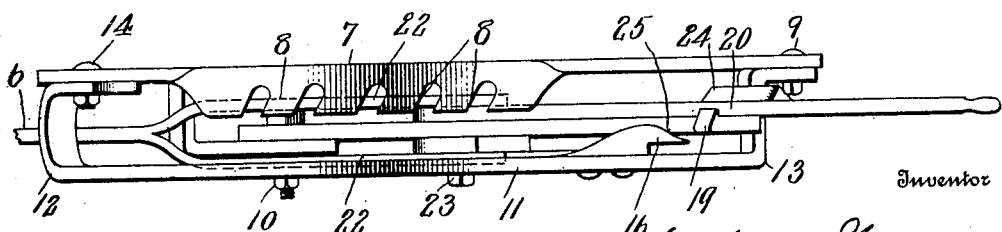
Witnesses
Jos. F. Collins.
Ida J. Stanley.
Inventor
Walter C. Moors
By Edwin A. Clarkson
Attorney

UNITED STATES PATENT OFFICE.

WALTER C. MOORS, OF OWENSBORO, KENTUCKY.

WAGON-BRAKE.

No. 892,286.

Specification of Letters Patent.

Patented June 30, 1908.

Application filed September 26, 1907. Serial No. 394,702.

*To all whom it may concern:*

Be it known that I, WALTER C. MOORS, a citizen of the United States, residing at Owensboro, in the county of Daviess, State of Kentucky, have invented certain new and useful Improvements in Wagon-Brakes, of which the following is a specification.

This invention is an improvement upon the construction shown in my Patent #570,138, issued October 27, 1896, and it is the object of my invention to improve the construction shown in my former patent and to provide a series of wagon-brake levers, which can be attached to any body or gear brake without altering its present mode of construction; and with these and minor objects in view my invention consists in the parts and combination of parts, as will be hereinafter more fully pointed out.

In the accompanying drawing—Figure 1 is a side elevation of a wagon with my improved brake in position; Fig. 2 is a detail view of the brake levers in the position they would assume with the brake on; Fig. 3 is a top plan view of the braking levers and rack detached; Fig. 4 is a sectional view on the line 4—4 of Fig. 1; Fig. 5 is a detail sectional view on the line 5—5 of Fig. 1.

1 represents a wagon body of approved construction and 2 the rear wheel thereof, 3 a brake shoe, 4 a brake lever, 5 a link connecting the brake lever with the brake shoe and 6 a brake rod. These parts just described may be of any approved construction and, therefore, form no part of my present invention.

7 represents a segment rack provided with suitable teeth 8 which are, as shown in Fig. 3, inclined rearwardly. This segment rack is secured by means of bolts 9 and 10 to the side of the wagon body.

11 is a bar, the ends of which are turned inward, as at 12 and 13, and secured to the segment rack by means of the bolts 14 and 9.
This bar is provided near its forward end with a catch or hook 16 opening toward the front of the wagon. From Fig. 3 it will be seen that by reason of the rearward inclination of the teeth 8, the openings between them are inclined toward the rear of the wagon, while the catch 16 is open toward the front of the wagon. The bar 11 is, as will be seen from the drawing, spaced from and parallel to the segment rack 7.

17 is a moving lever pivoted at its lower end to the segment rack at 10, the upper end being free to be moved between the segment and the bar 11. The upper end of this moving lever is provided with a lug 19 which extends rearwardly from and to one side of the lever.

20 is the power lever, the lower end of which is rebent so as to form a substantially U-shaped end. This U-shaped end is deflected forwardly from the plane of the body of the lever, as is clearly shown in the several views. The moving lever passes through the U-shaped end of the power lever and the power lever is fulcrumed as at 21 to the moving lever.

The brake rod 6 is provided with a forked end 22 adapted to loosely embrace the U-shaped end of the power lever and is pivotally secured thereto by means of the bolt 23.

24 is a tooth formed integral with the power lever 20 and adapted to engage the series of teeth 8 on the segment bar.

The operation of the brake is as follows: When the brake is off, the position of the parts is as indicated in Fig. 1. When it is desired to put the brake on light, the power lever is pushed toward the forward end of the segment rack and when in the position shown in Fig. 3 it is moved transverse of the wagon body until the moving lever is in line with the catch 16. In this position the brake is in slight contact with the wheel. The power lever is, in the event that additional braking power is required, pulled toward the wagon or vehicle body so as to be free from the lug 19 of the moving lever, whereupon the power lever is free to be drawn toward the rear of the wagon and caused to engage any one of the series of teeth 8, according to the amount of braking power desired. This rearward movement of the power lever does not in any manner change the position of the moving lever as said lever is still in engagement with the catch 16. In the event that it is desired to release the brake the operator disengages the power lever from the segment rack and pushes it forward toward the front of the vehicle until it snaps over the lug 19 of the moving lever, whereupon the two levers are again joined for simultaneous action. When in this position the power lever is again moved forward thus carrying with it the moving lever from engagement with the catch 16, whereupon both levers may be thrown simultaneously to the position shown in Fig. 1.

It will be noticed that the nose 25 of the catch 16 is drawn to a comparatively sharp edge. The object of this is as follows; when the levers are thrown to their extreme forward position beyond the catch 16 the operator presses outward upon them, thus placing the moving lever in position to slide in the catch 16. In sliding in the catch 16 the nose of the catch enters between the levers, thus causing them to be forced apart as the power lever is drawn rearwardly, whereby the levers may be moved simultaneously to throw off the brake.

What I claim and desire to secure by Letters Patent is—

1. In a wagon brake, the combination with a segment-rack, a bar secured to but spaced from said rack, and a catch secured to said bar, of a lever pivotally mounted and adapted to engage the catch on the said bar, a power lever capable of independent movement and fulcrumed upon said lever and connected with the brake and adapted to engage the teeth of the segment-rack.

2. In a wagon brake, the combination with a segment-rack, a bar secured to but spaced from and parallel with said rack, and a catch on said bar, of a moving lever constructed to engage the said catch, and a power lever capable of independent movement and pivotally mounted on said moving lever and constructed to engage the segment-rack.

3. In a wagon brake, the combination with the segment-rack having teeth inclined rearwardly, a bar secured to but spaced from said rack, and a catch on said bar having a sharp edge, of a moving lever constructed to engage said catch and a power lever pivotally mounted on said moving lever and constructed to engage the said segment-rack, said power lever constructed to move the moving lever into position for engaging said catch and separated from said moving lever by the nose of said catch.

In testimony whereof I affix my signature in presence of two witnesses.

WALTER C. MOORS.

Witnesses:
C. W. WELLS,
F. A. WALKER.